United States Patent
Grimmer et al.

(10) Patent No.: US 10,902,597 B2
(45) Date of Patent: Jan. 26, 2021

(54) COMPARING MEDICAL IMAGES

(71) Applicant: Siemens Healthcare GmbH, Erlangen (DE)

(72) Inventors: Rainer Grimmer, Erlangen (DE); Christian Tietjen, Fuerth (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 53 days.

(21) Appl. No.: 15/986,902

(22) Filed: May 23, 2018

(65) Prior Publication Data

US 2018/0350075 A1 Dec. 6, 2018

(30) Foreign Application Priority Data

Jun. 1, 2017 (EP) ..................................... 17173975

(51) Int. Cl.
*G06T 7/00* (2017.01)
*G06T 7/40* (2017.01)
*G06T 7/41* (2017.01)

(52) U.S. Cl.
CPC .............. *G06T 7/0016* (2013.01); *G06T 7/40* (2013.01); *G06T 7/41* (2017.01);
(Continued)

(58) Field of Classification Search
CPC .......... G06T 7/0016; G06T 7/41; G06T 7/40; G06T 2207/10072; G06T 2207/10081; G06T 2207/10084; G06T 2207/10088; G06T 2207/10104; G06T 2207/20081; G06T 2207/20104; G06T 2207/30096; G06T 7/0012; G06T 7/0051; G06T 7/0002; G06T 7/0024; G06T 7/408; G06T 7/0079;
(Continued)

(56) References Cited

U.S. PATENT DOCUMENTS

2017/0103525 A1* 4/2017 Hu ........................ G06T 7/0012
2017/0236283 A1* 8/2017 Lambin ................. G06T 7/0016
382/131

FOREIGN PATENT DOCUMENTS

WO WO 2016059493 A1 4/2016
WO WO 2016060557 A1 4/2016

OTHER PUBLICATIONS

Hongmei, Zhu et al.: "MR Multi-Spectral Texture Analysis Using Space-frequency Information"; in: Proc. Int. Conf MET MBS; pp. 1-5; XP055410907; 2004.

(Continued)

*Primary Examiner* — Zhitong Chen
(74) *Attorney, Agent, or Firm* — Harness, Dickey & Pierce, P.L.C.

(57) ABSTRACT

An embodiment of the invention relates to a scanning device. The scanning device includes a scanning unit to detect radiation received during a scanning operation on an object. An imaging unit is arranged to reconstruct an image for a location on the object based on the detected radiation. A texture analysis unit receives an indicated area of interest of a medical image and computes at least one texture metric for the area of interest. An image comparison unit receives a plurality of texture metrics for a common area of interest within respective medical images and outputs a change metric indicating a measure of variation over time for the area of interest based on a comparison of the plurality of texture metrics.

18 Claims, 8 Drawing Sheets

(52) U.S. Cl.
CPC .............. *G06T 2207/10072* (2013.01); *G06T 2207/10081* (2013.01); *G06T 2207/10084* (2013.01); *G06T 2207/10088* (2013.01); *G06T 2207/10104* (2013.01); *G06T 2207/20081* (2013.01); *G06T 2207/20104* (2013.01); *G06T 2207/30096* (2013.01)

(58) Field of Classification Search
CPC .... G06T 9/00; G06T 5/00; G06T 3/00; G06T 1/0021; A61B 1/00; A61B 5/00; H04N 1/40–60; H04N 9/69–74; H04N 19/00; G06K 9/00; G06F 16/00
See application file for complete search history.

(56) References Cited

OTHER PUBLICATIONS

Necib, H. et al.: "Detection and characterization of the tumor change between two FDG PET Scans using Parametric Imaging"; in: ISBI; pp. 21-24; XP 31270966A; 2008.
Larroza, Andrés et al.: "Texture Analysis in Magnetic Resonance Imaging: Review and Considerations for Future Applications"; in: Assessment of Cellular and Organ Function and Dysfunction using Direct and Derived MRI Methodologies; pp. 75-106; XP 055395719; ISBN 978-953-51-2723-9; DOI 10.5772/64641; 2016.
Extended European Search Report #17173975.8 dated Oct. 10, 2017.

* cited by examiner

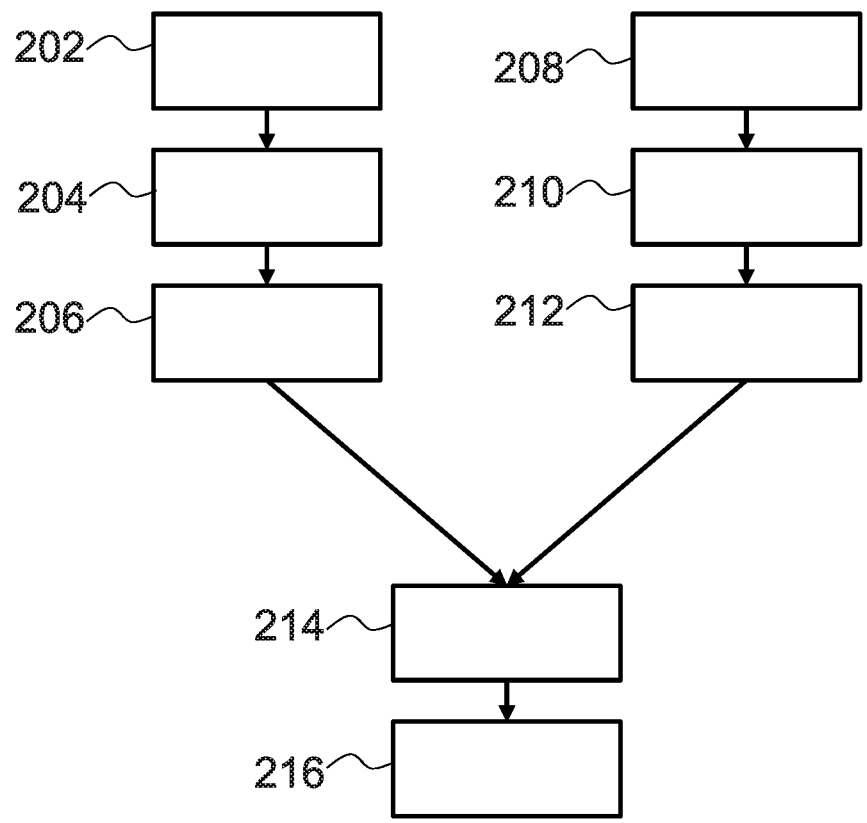

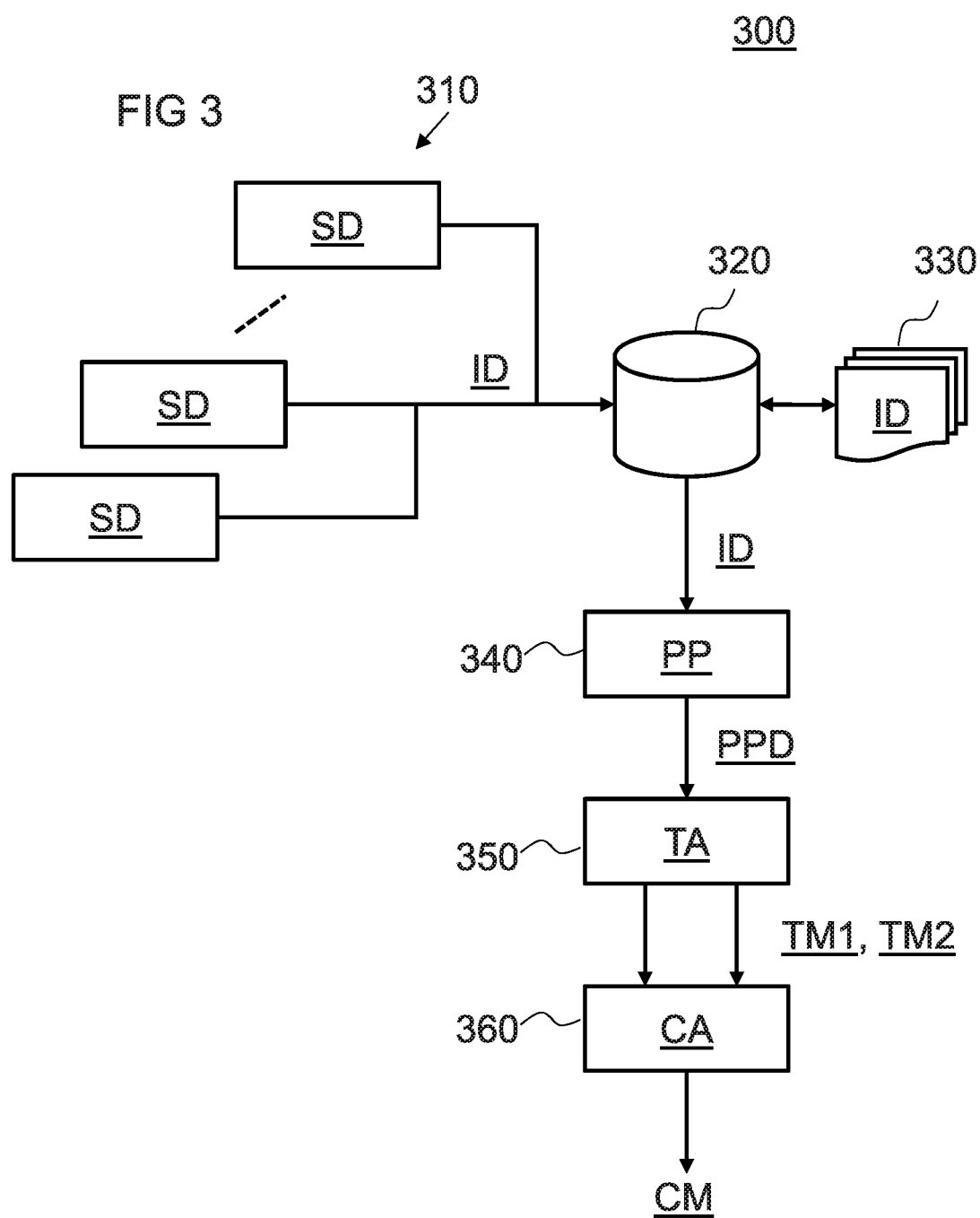

COMPARING MEDICAL IMAGES

PRIORITY STATEMENT

The present application hereby claims priority under 35 U.S.C. § 119 to European patent application number EP17173975.8 filed Jun. 1, 2017, the entire contents of which are hereby incorporated herein by reference.

FIELD

At least one embodiment of the invention relates generally to comparing medical images, such as those generated with a scanning device. In one embodiment, the invention relates generally to a computer-implemented method of comparing medical images generated by one or more scanning devices. In another embodiment, the invention relates generally to a scanning device. In further embodiments, the invention relates generally to a non-transitory machine-readable storage medium.

BACKGROUND

Scanning devices, such as computed tomography, positron emission tomography, magnetic resonance or ultrasound devices, are used to generate medical images that may be used to measure aspects of anatomy. These medical images are generated based on sensor data read by the scanning device, such as data indicating detected radiation or reflected sound waves. Medical images from these devices may be useful to identify diseases that manifest as a disorder of expected anatomic structure.

For example, computed tomography may use X-rays to scan an interior of an object such as a human body and generate a number of two-dimensional cross-sectional slices of the object. In certain cases, a volumetric or three-dimensional model of the interior structure of the object may be generated instead of, or as well as, the two-dimensional slices. Both may be considered "medical images".

Scanning devices are often used to evaluate a particular medical treatment. It is common to follow up a medical treatment with a scan, such as a CT scan, several months after the treatment is performed, to ascertain changes in anatomical structure. For example, several months after a radiotherapy or chemotherapy treatment has been provided to a patient, a CT scan of a treated organ may be performed in order to evaluate the effect of the treatment. For example, a full perfusion CT scan may be performed on a patient to determine arterial blood support of a tumor of the liver.

In the cases above, medical images are often compared by sight by a radiologist or group of clinicians to ascertain changes in anatomical structure. This is a difficult task. For example, such comparisons may only detect obvious macroscopic changes. Changes are also determined qualitatively rather than quantitatively. For example, two different radiologists may characterize any changes differently. Additionally, to perform accurate comparisons, individuals must complete a long history of training. As such, access to such individuals may be a bottleneck in effectively processing medical images.

Medical images are also by nature difficult to compare. For example, each scan of an object will be different. This is compounded when the scans are performed on different scanning devices and/or at different locations.

SUMMARY

The inventors have discovered that even though there are standards for the exchange of medical images, such as the Digital Imaging and Communications in Medicine (DICOM) standard, these standards typically address the data formats for the images; the underlying images can still differ. This can lead to false positive and false negative errors.

The inventors have further discovered that it is thus desirable to develop techniques for comparing medical images that reduce the need for domain-specific knowledge and that are robust to differences in scanning methods and devices. This may enable changes in medical images to be more accurately detected.

Embodiments of the present application is directed to a computer-implemented method, a scanning device, and a non-transitory machine-readable storage medium. The dependent claims are related to further aspects of the invention.

At least one embodiment of the invention relates in one aspect to a computer-implemented method of comparing medical images generated by scanning devices, the method comprising:

retrieving, from computer readable storage, a first medical image generated at a first time;
  identifying an area of interest within the first medical image;
  performing texture analysis on the area of interest to determine at least one texture metric associated with the first time;
  retrieving, from computer readable storage, a second medical image generated at a second time subsequent to the first time;
  identifying an area within the second medical image corresponding to the area of interest within the first medical image;
  performing texture analysis on the area of the second medical image to determine at least one texture metric associated with the second time;
  comparing the at least one texture metric associated with the second time with the at least one texture metric associated with the first time; and
  outputting a change metric based on the comparison.

The invention relates in one embodiment to a scanning device comprising:

a scanning unit to detect radiation receiving during a scanning operation on an object;
  an imaging unit to reconstruct an image for a location on the object based on the detected radiation;
  a texture analysis unit to receive an indicated area of interest of a medical image and compute at least one texture metric for the area of interest; and
  an image comparison unit to receive a plurality of texture metrics for a common area of interest within respective medical images and to output a change metric indicating a measure of variation over time for the area of interest based on a comparison of the plurality of texture metrics.

The invention relates in one embodiment to a non-transitory machine-readable storage medium storing instructions that, when executed by a processor, cause the processor to:

obtain, from a memory communicatively coupled to the processor, data indicating a first set of texture measures computed for a first medical image of an object;
  obtain, from the memory, data indicating a second set of texture measures computed for a second medical image of the object, the first and second medical images being generated from different scans of the object within a scanning device; and compare the second set of texture measures with the first set of texture measures to generate an indication of variation of the object between the different scans.

BRIEF DESCRIPTION OF THE DRAWINGS

Reference is made to the fact that the described methods and the described scanning device are merely example embodiments of the invention and that the invention can be varied by a person skilled in the art, without departing from the scope of the invention provided it is specified by the claims.

The invention will be illustrated below with reference to the accompanying figures using example embodiments. The illustration in the figures is schematic and highly simplified and not necessarily to scale.

The above mentioned attributes, features, and advantages of this invention and the manner of achieving them, will become more apparent and understandable with the following description of the example embodiments of the invention in conjunction with the corresponding drawings.

Figure 1:
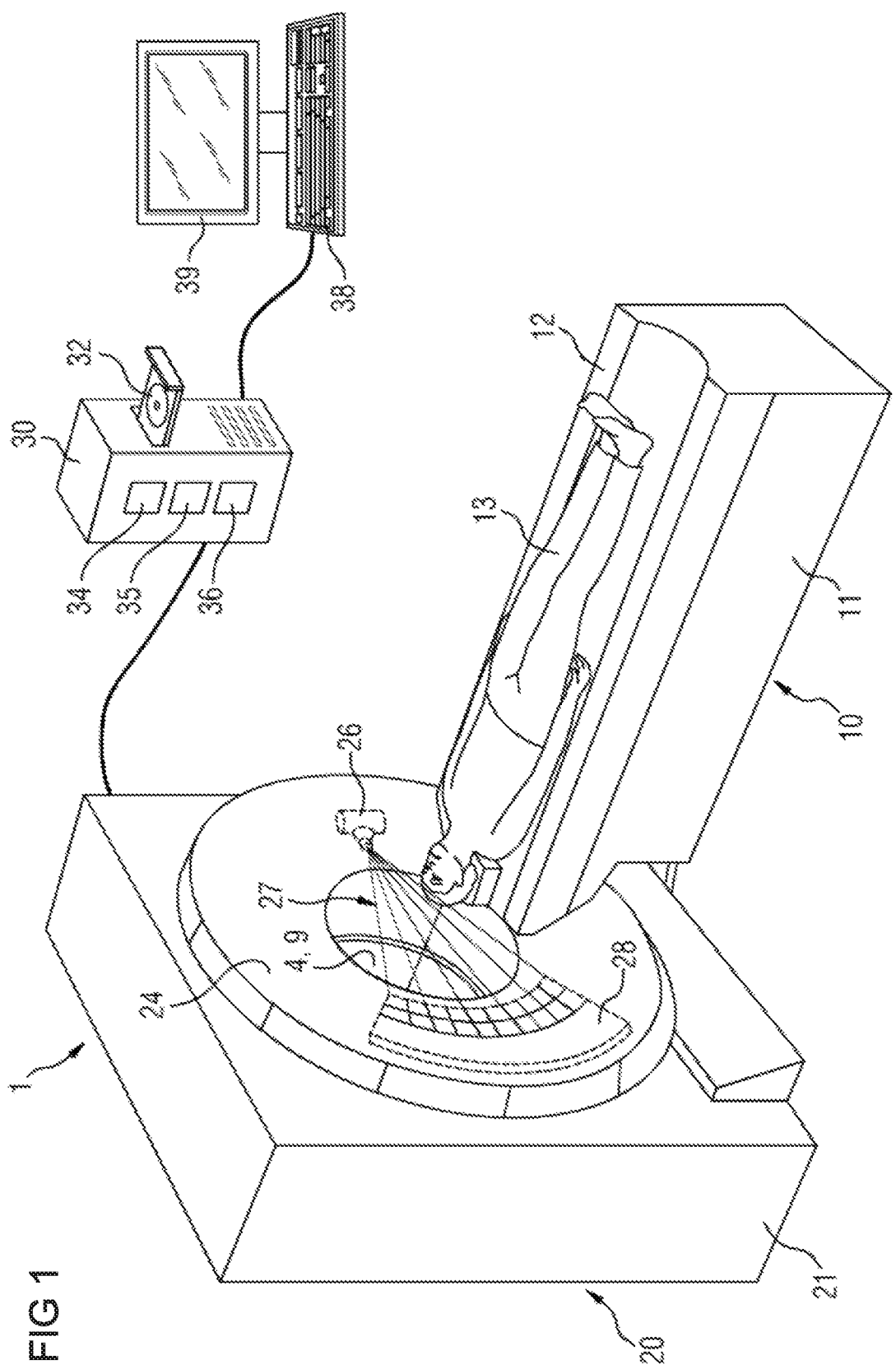
Figure 4A:
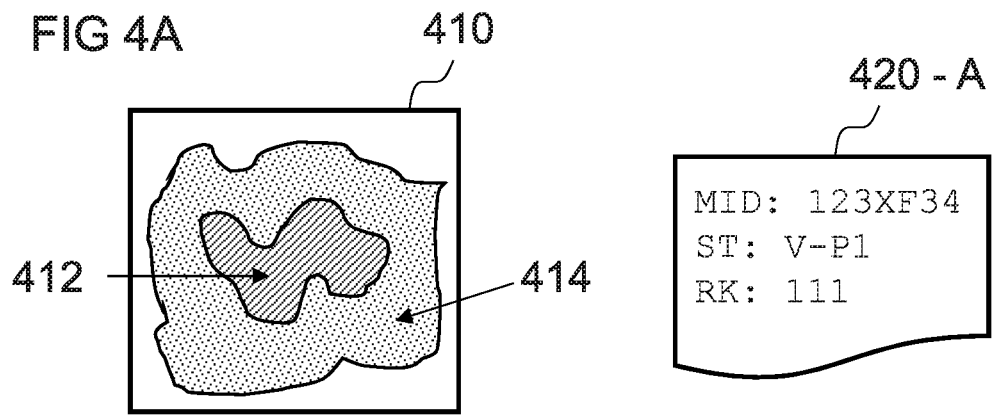
Figure 4B:
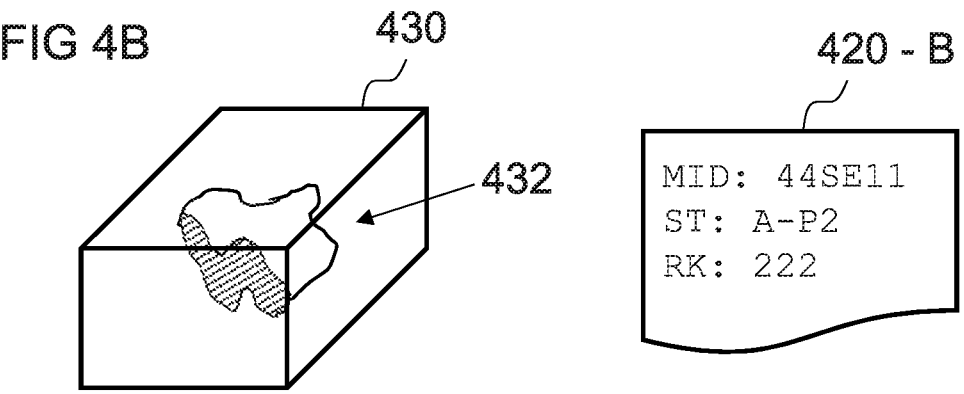
Figure 4C:
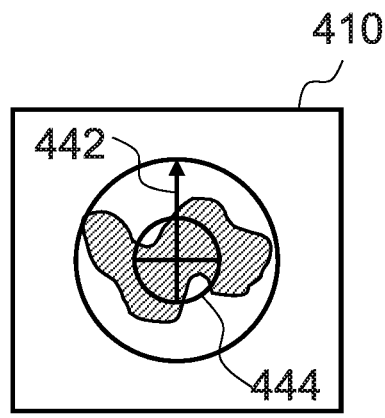
Figure 5:
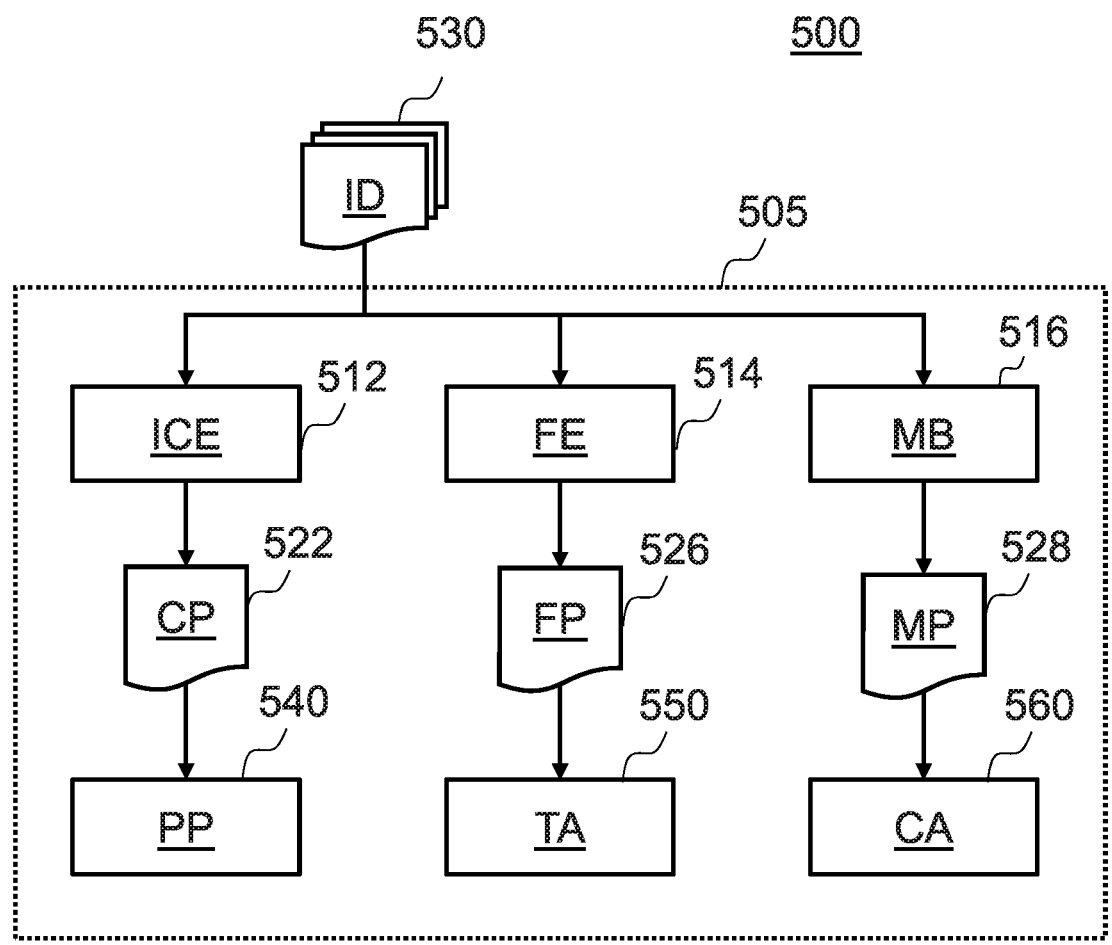
Figure 6A:
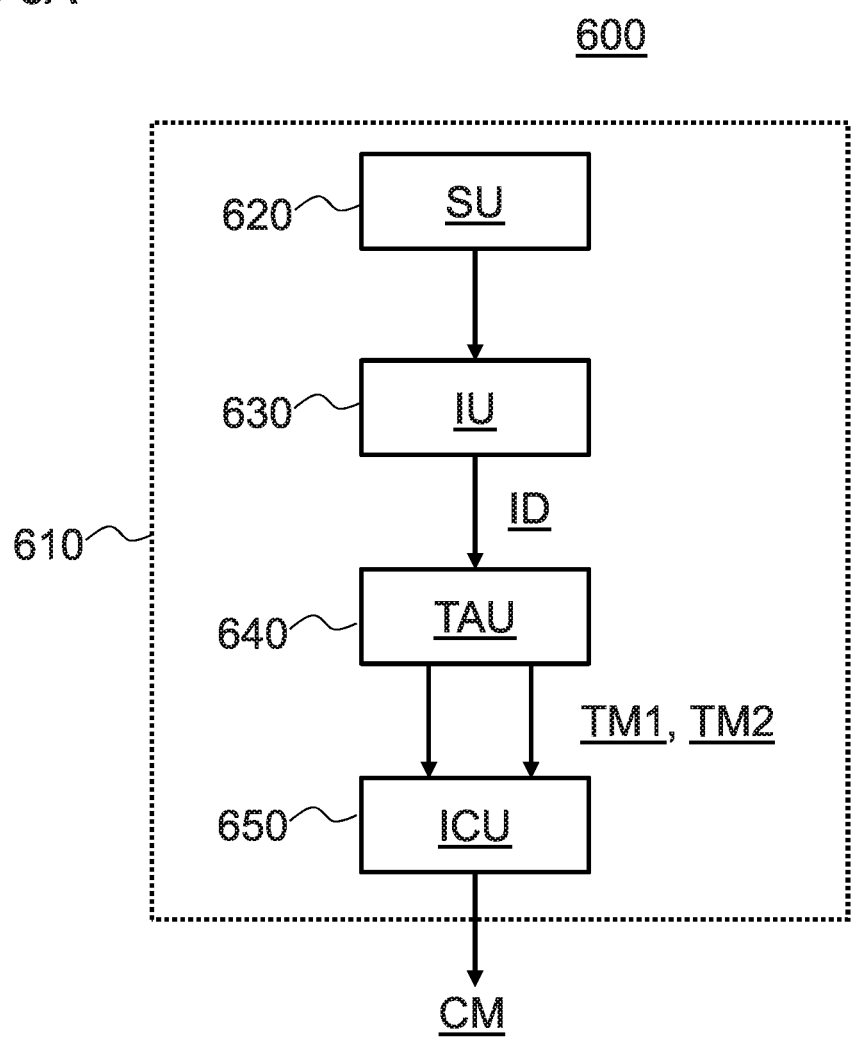
Figure 6B:
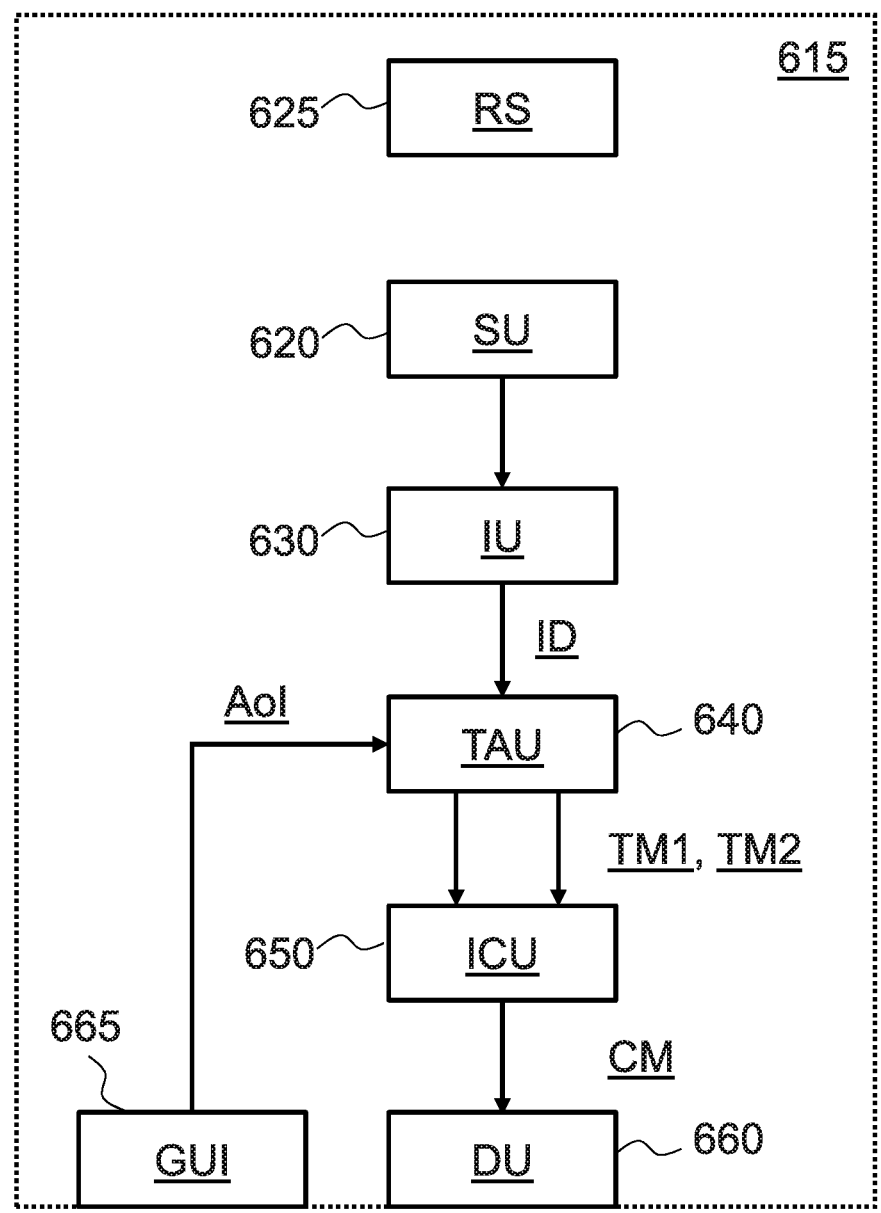
Figure 7:
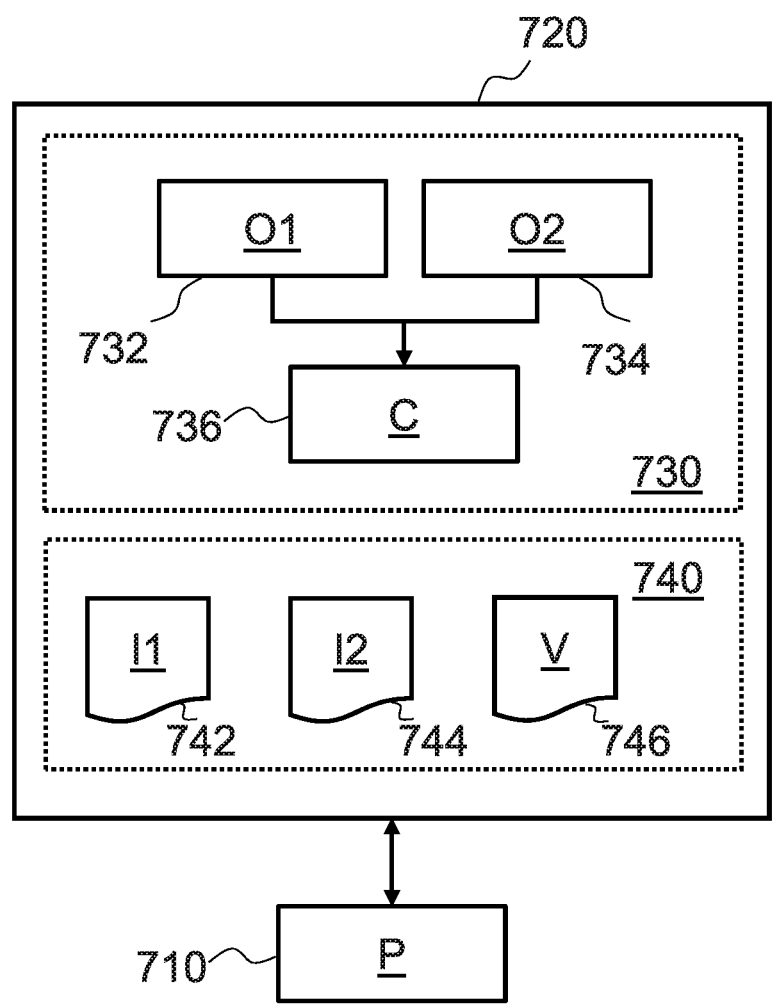

FIG. 1 is a schematic diagram of a scanning device according to one embodiment of the invention;

FIG. 2 is a workflow diagram illustrating a method according to one embodiment of the invention;

FIG. 3 is a schematic diagram of a system arranged to perform methods according to one embodiment of the invention;

FIG. 4A is a representation of an image, which may be a digital image, of an example object to be imaged by a scanning device according to one embodiment of the invention and data representing scanning characteristics of the scanning device;

FIG. 4B is a representation of an image, which may be a digital image, of an example object to be imaged by a scanning device according to one embodiment of the invention and data representing scanning characteristics of the scanning device;

FIG. 4C is a representation of an image, which may be a digital image, of an example object to be imaged by a scanning device according to one embodiment of the invention;

FIG. 5 is a schematic diagram illustrating a machine learning system for determining a correction factor;

FIG. 6A is a schematic diagram of a scanning device according to one embodiment of the invention;

FIG. 6B is a schematic diagram of a scanning device according to one embodiment of the invention; and FIG. 7 is a schematic diagram of a non-transitory machine-readable storage medium according to one embodiment of the invention.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention relates in one aspect to a computer-implemented method of comparing medical images generated by scanning devices, the method comprising:

retrieving, from computer readable storage, a first medical image generated at a first time;

identifying an area of interest within the first medical image;

performing texture analysis on the area of interest to determine at least one texture metric associated with the first time;

retrieving, from computer readable storage, a second medical image generated at a second time subsequent to the first time;

identifying an area within the second medical image corresponding to the area of interest within the first medical image;

performing texture analysis on the area of the second medical image to determine at least one texture metric associated with the second time;

comparing the at least one texture metric associated with the second time with the at least one texture metric associated with the first time; and outputting a change metric based on the comparison.

One embodiment of the invention relates in one aspect to a method, wherein performing texture analysis comprises:

retrieving data indicating at least one scanning characteristic;

calculating at least one correction factor on the basis of the scanning characteristic; and applying the at least one correction factor to the respective image.

One embodiment of the invention relates in one aspect to a method, wherein applying the at least one correction factor to the respective image comprises at least one of:

using the at least one correction factor to configure a pre-processing operation and applying the pre-processing operation to the respective image; and using the at least one correction factor to configure a texture analysis function and applying the texture analysis function to the respective image.

One embodiment of the invention relates in one aspect to a method, wherein the at least one scanning characteristic comprises data associated with one or more of:

a configuration of a scanning device used to obtain the respective image;

a method of scanning applied by the scanning device to obtain the respective image; and a reconstruction method used to generate the respective image based on radiation detected by the scanning device.

One embodiment of the invention relates in one aspect to a method, wherein retrieving data indicating at least one scanning device characteristic comprises parsing a Digital Imaging and Communications in Medicine, DICOM, data object associated with the respective image.

One embodiment of the invention relates in one aspect to a method, wherein the medical image is at least one of:

a two-dimensional tomographic image;

a three-dimensional image;

a four-dimensional image; and a multi-spectral image.

As used herein the term "medical image" refers to a representation of sensor data. This sensor data may be collected over time. As such, an image may be an n-dimensional representation which may be, for example, two-, three-, or four-dimensional (e.g. representing changes in time or spectral properties).

One embodiment of the invention relates in one aspect to a method, wherein the retrieving, identifying and performing operations are repeated for a plurality of medical images generated at a respective time, the plurality of medical images relating to different aspects of a scan by a scanning device;

wherein performing texture analysis for each respective medical image comprises:

computing a combined texture metric for each of the plurality of medical images for the respective time; and wherein comparing the at least one texture metric associated with the second time with the at least one texture metric associated with the first time comprises:

comparing the combined texture metric associated with the second time with the combined texture metric associated with the first time.

One embodiment of the invention relates in one aspect to a method, wherein the at least one texture metric comprises one or more of:

a pixel intensity metric;

a pixel variation metric;

a pixel correlation metric;

an edge metric;

a spatial change metric; and a frequency change metric.

One embodiment of the invention relates in one aspect to a method, wherein performing texture analysis comprises:

determining a feature vector based on at least pixel values of the respective medical image;

applying a machine learning function to the feature vector; and generating the at least one texture metric associated with the respective time based on an output of the machine learning function.

One embodiment of the invention relates in one aspect to a method, wherein comparing the at least one texture metric associated with the second time with the at least one texture metric associated with the first time comprises:

generating a feature vector based on the respective texture metrics;

applying a machine learning function to the feature vector; and determining the change metric based on an output of the machine learning function.

The invention relates in one embodiment to a scanning device comprising:

a scanning unit to detect radiation receiving during a scanning operation on an object;

an imaging unit to reconstruct an image for a location on the object based on the detected radiation;

a texture analysis unit to receive an indicated area of interest of a medical image and compute at least one texture metric for the area of interest; and an image comparison unit to receive a plurality of texture metrics for a common area of interest within respective medical images and to output a change metric indicating a measure of variation over time for the area of interest based on a comparison of the plurality of texture metrics.

One embodiment of the invention relates in one aspect to a scanning device, wherein the scanning unit comprises one of:

an X-ray computed tomography, CT, scanning device;

a positron emission tomography, PET, scanning device;

a magnetic resonance scanning device.

One embodiment of the invention relates in one aspect to a scanning device, comprising:

a display unit, wherein the image comparison unit is configured to out-put the change metric as a color overlay upon a medical image for display on the display unit.

One embodiment of the invention relates in one aspect to a scanning device, comprising:

a graphical user interface to indicate an area of interest within a medical image.

The invention relates in one embodiment to a non-transitory machine-readable storage medium storing instructions that, when executed by a processor, cause the processor to:

obtain, from a memory communicatively coupled to the processor, data indicating a first set of texture measures computed for a first medical image of an object;

obtain, from the memory, data indicating a second set of texture measures computed for a second medical image of the object, the first and second medical images being generated from different scans of the object within a scanning device; and compare the second set of texture measures with the first set of texture measures to generate an indication of variation of the object between the different scans.

The instructions can be, for example, a computer program or comprise another element apart from the computer program. This other element can be hardware, for example a memory device, on which the computer program is stored, a hardware key for using the computer program and the like, and/or software, for example a documentation or a software key for using the computer program.

According to one embodiment of the invention, medical images generated at different points in time are compared. These medical images may be generated using different scanning devices, or different configurations of a common scanning device. The comparison involves identifying an area of interest within each image and performing texture analysis on these areas. Texture metrics from the analysis are compared to output a change metric, which indicates quantitatively an amount of change between the two images. If the areas of interest show an anatomical structure, the change metric may indicate a level of change in the anatomical structure.

Texture analysis in this context refers to a characterization of regions in a medical image by their texture content, i.e. as a function of spatial variation in pixel or voxel intensity values. For example, texture analysis is a quantitative measure relating to qualitative terms such as "entropy", "kurtosis", or "skewness" that are derived from measures of change in a three-dimensional surface. Within medical images, different textures may correspond to, amongst others, different densities of tissue, different tissues, different systems of support structures and different surface features. Texture analysis may be performed in one or more color channels, e.g. on a gray-scale channel or on one or more of red, green and blue color channels of a medical image. In the case of color images, the color channels may represent aspects of the scanning method, e.g. different frequency and/or energy bands for detected radiation.

The area of interest may comprise a two or three dimensional portion of a medical image that is identified through segmentation. For example, it may be defined as a shape or volume within these dimensions, such as a circle or sphere having a defined center point and diameter.

The comparison process may be automatically applied on acquisition or supply of both medical images. For example, the change metric may be used to determine a level of change in an anatomical structure such as a tumor. Machine learning functions may be applied to at least one of pixel values and texture metrics to implement the method. The change metric may be defined in the image space, e.g. in two or three dimensions. This allows a visualization of the change to be applied to one of the medical images, e.g. as a visual overlay on a graphical display.

To accommodate variations between scans, such as changes in scanning methods, changes in scanning conditions, and changes in scanning devices, data indicating at least one scanning characteristic may be retrieved with each image. This data may be used to calculate correction factors that are applied to the respective images. The correction factor may be used to normalize the image and/or parameterize a texture analysis function. The correction applied using the correction factor enables more accurate and robust comparison of medical images, i.e. ensures that the change metric is representative of an actual change in an anatomical structure present in the images as opposed to noise.

In certain cases, texture analysis may be performed based on a plurality of medical images generated at each of the first and second times. For example, each medical image may be a synthetic image constructed by combining a plurality of separate medical images or the texture metrics may be computed as a function of these separate medical images. These separate medical images may relate to different phases of a scan, e.g. different periods of time during the scan, and/or different detection aspects, such as different spectral bands (e.g. a multi spectral image) or energy levels. An image may be made up of frames acquired at a particular time (e.g. a series of two-dimensional or three-dimensional data that varies over time). In one case, the different phases of a scan may correspond to the presence or absence of a pharmaceutical agent or contrast. Combining medical images from each time may further improve change detection between the images and reduce the influence of noise.

The medical imaging device can be, for example, be selected from the group consisting of a computed tomography device, a magnetic resonance imaging device, a molecular imaging device, a single-photon emission computed tomography (SPECT) device, a PET device and combinations thereof. The medical imaging device can be, for example, a combination of an imaging modality and a therapy modality, in particular a radiation therapy modality.

FIG. 1 is a diagram illustrating a scanning device 1 according to an embodiment of the present invention. The scanning device 1 may be a computed tomography (CT) device as shown, by way of example, or may be any other type of scanning device. In particular, the scanning device may be a medical imaging device. It should be noted that the scanning device 1 is but one example and the structure and configuration of other scanning devices will vary.

The scanning device 1 includes a gantry 20. The gantry 20 has a stationary support frame 21. The gantry 20 has a rotor 24 mounted so it can be rotated by a pivot bearing device. The scanning device 1 has an image recording region 4 formed by a tunnel-like opening 9. A region of an object to be imaged can be arranged in the image recording region 4.

The object (for example, a patient 13) may, in use, be located on a patient-positioning device 10. The patient-positioning device 10 has a positioning table 11 and a transfer plate 12 for positioning the patient 13. The transfer plate 12 is arranged on the positioning table 11 so it can be moved relative to the positioning table 11 such that the transfer plate 12 can be introduced into the image recording region 4 in a longitudinal direction of the transfer plate 12.

A radiation projection device 26, 28 is arranged on the rotor 24. The radiation projection device 26, 28 has a radiation source 26 which is designed to emit radiation 27, and a detector 28 which is designed for detection of the emitted radiation 27. The radiation 27 can pass from the radiation source 26 to the region to be imaged and, following an interaction with the region to be imaged, strike the detector 28. In this way a projection profile of the region to be imaged can be detected.

The radiation projection device 26 may be, for example, a source of high-energy electromagnetic radiation. For example, the radiation projection device 26 may be an X-ray generator arranged to emit X-ray radiation.

The radiation projection device 26 is arranged to be moveable such that the beam of radiation may be directed at the object to be imaged. A collimator (not shown) may be adjustable such that the extent of the beam may cover more or less of the object to be imaged.

At least one projection profile respectively can be detected for different arrangements of the radiation projection device 26 and the detector in respect of the region of the object to be imaged by rotation of the radiation projection device 26, 28 about the image recording region. A plurality of projection profiles can form a projection data set.

The scanning device 1 may comprise a control device 30 for controlling one or more parameters of the scanning device 1. For example, the control device 30 may control a position and/or an orientation of the radiation projection device 26 to control a position from which radiation is emitted and/or one or more settings of the collimator. For example, the control device 30 may be arranged to generate control signals for controlling drive motors or other electromechanical actuators connected to the radiation projection device 26 and/or the collimator to control the position, orientation, and/or extent of an emitted beam of radiation.

The control device 30 may be implemented using hardware and/or software. In some examples, the control device 30 comprises, for example, a computer and/or a data processing system. The control device 30 may comprise a computer-readable medium 32, a processor 34, a data processing unit 35 and an image reconstruction unit 36. A medical image, in particular a tomographic medical image, of the region to be imaged can be reconstructed on the basis of a projection data set by the image reconstruction unit 36.

The control device 30 may be arrange to retrieve, from a computer readable storage, such as memory (not shown), data in the form of a medical images.

The memory may be any suitable form of memory. For example, the memory may comprise volatile memory, such as random access memory (RAM) and/or non-volatile memory such as read only memory (ROM) or flash memory. Furthermore, the memory might comprise multiple, separate, memory devices and may comprise a combination of volatile and non-volatile memory. In some examples, certain component of the invention, such as the computer program and/or the model, may be stored in one memory device, while other components may be stored in another memory device.

The memory (or other memory) may also store data in the form of a model that is trained by implementing a machine learning algorithm prior to installation and use of the scanning device 1 in an operation setting. For example, the model may be trained by supplying sample images to the model and, with input from a human operator, the machine learning algorithm may learn to detect features in the sample data. In some examples, the available sample data may be augmented by rotating and/or flipping the sample images.

Furthermore, the memory may store a computer program executable by the processor 34, to perform the methods described herein.

The scanning device 1 may also comprise an input unit 38 for inputting control information, for example, scanning parameters, and examination parameters and an output unit 39 for outputting control information and images, in particular a medical image obtained by the methods described below.

FIG. 2 shows a workflow diagram illustrating a method 200 according to one aspect of the invention. In particular, FIG. 2 shows a workflow diagram illustrating a computer-implemented method of comparing medical images generated by scanning devices, such as the scanning device 1 depicted in FIG. 1. While reference below is made to control device 30 of FIG. 1, the method is not limited to the scanning device 1 or the control device 30.

At block 202, the control device 30 retrieves, from computer readable storage, a first medical image generated at a first time. For example, the first medical image may be a reference image of an organ—for example a diseased organ—on which a medical treatment or therapy is to be performed.

At block 204, the control device 30 identifies an area of interest within the first medical image. For example, the area of interest may be an area of an organ on which a medical treatment or therapy is to be performed. The control device 30 may identify the area of interest based on input from a human operator, and/or on the basis of a machine learning algorithm. An area of interest may be defined as a region of space or volume within the first medical image, for example, a two or three dimensional shape having co-ordinates in a coordinate space. The co-ordinate space may defined relative to the image or relative to a known reference structure (e.g. an anatomical structure or structure of scanning device 1).

At block 206, the control device 30 performs texture analysis on the identified area of interest to determine at least one texture metric associated with the first time. Texture analysis may comprise processing sets of pixel or voxel intensities from the area of interest to determine measures of the spatial arrangement of those intensities. The at least one texture metric may be a measure of this spatial arrangement, e.g. a computed statistical metric based on the sets of pixel or voxel intensities. The at least one texture metric may comprise a plurality of different metrics, e.g. different moments of the pixel or voxel intensities and/or the output of a plurality of processing functions. In certain cases, a plurality of texture metrics for different regions of the area of interest may be computed.

At block 208, the control device 30 retrieves, from computer readable storage, a second medical image generated at a second time. For example, the second medical image may be an image of an organ—for example the diseased organ—on which a medical treatment or therapy has been performed.

At block 210, the control device 30 identifies an area of interest within the second medical image. For example, the area of interest may be an area of the organ on which a medical treatment or therapy has been performed. The control device 30 may identify the area of interest based on input from a human operator, and/or on the basis of a machine learning algorithm. In one example, the area of interest within the second medical image may be identified using data from the first medical image, e.g. by searching the second medical image for a region that matches (with respect to a defined threshold) the area of interest defined for the first medical image. If the area of interest for the first medical image is defined in a coordinate system relative to an object being scanned or a scanning device, and the second medical image uses the same coordinate system, then the area of interest for the second medical image may comprise a region of space or volume based on the coordinates defining the area of interest defined for the first medical image. In certain cases, a human operator may use input unit 38 to define and/or confirm the area of interest for the second medical image. In certain examples, an alignment function may be used to align the areas of interest for the respective images, e.g. based on a number of computed image features in each area of interest (such as scale-invariant feature transform features).

At block 212, the control device 30 performs texture analysis on the identified area of interest to determine at least one texture metric associated with the second time. Block 212 involves applying the same texture analysis functions that were applied at block 206 to the area of interest for the second medical image.

The texture analyses performed at blocks 206 and 212 may, for example, comprise retrieving data indicating a (i.e. at least one) scanning characteristic used to obtain the respective image. Data may be retrieved from data storage, e.g. based on an identifier received with the medical images. The scanning characteristic may define a configuration of the scanning device. The scanning characteristic is described in more detail below but may relate to, for example, hardware characteristics of the scanning device, scanning parameters used when operating the scanning device, or reconstruction parameters used to reconstruct an image from data obtained by the scanning device. A correction factor, based on the scanning characteristic may be calculated by the control device 30 and the correction factor may be applied by the control device 30 to the respective image (i.e. the first or second medical image).

The correction factor may be applied to the respective image by, for example, using the at least one correction factor to configure a pre-processing operation and applying the pre-processing operation to the respective image. The pre-processing operation may be an image processing function that is parameterized based on the correction factor. The image processing function may be applied using a transformation matrix that is applied to the pixel values of the respective image. In one case, a correction factor may be calculated for a set of images such that input data is transformed to a common ground truth during a pre-processing operation. Hence, images may be normalized to the ground truth to reduce factors that may negatively affect the texture analysis. Further examples of this are discussed below with reference to FIG. 5.

In another example, the correction factor may be applied to the respective image by, for example, using the at least one correction factor to configure a texture analysis function and applying the texture analysis function to the respective image. For example, the correction factor may comprise a configuration parameter for the texture analysis function, and/or may define a particular set of image processing parameters, such as a particular kernel or kernel values.

The scanning characteristic may, for example, include details relating to a configuration of the scanning device used to obtain the respective image; a method of scanning applied by the scanning device to obtain the respective image; and a reconstruction method used to generate the respective image based on radiation detected by the scanning device.

At block 214, the control device 30 compares the at least one texture metric associated with the second time with the at least one texture metric associated with the first time. If a plurality of texture metrics are generated based on each respective image, then the two sets of metrics may form the input to a comparison function. The comparison function may be a distance function, such as a Euclidean distance (L2 norm) function or a cosine similarity function. In other examples, as described in more detail below, sets of texture metrics generated for each medical image may be concatenated to form an input feature vector for a machine learning function.

At block 216, the control device 30 outputs a change metric based on the comparison between the at least one texture metric associated with the second time with the at least one texture metric associated with the first time. In one example, this may comprise outputting a distance metric as a measure of change between the two times. In an example where the texture metrics form the input for a machine learning function, the function may be configured (e.g. trained) to output a feature vector (e.g. a set of logits) that indicates (e.g. predicts) a state change between the two medical images. In one case, the change metric may have a spatial resolution, e.g. the comparison at block 214 may be performed for sets of one or more pixels. In this case, the output at block 216 may have a spatial resolution in two or more dimensions. This output may be used to generate a spatial overlay for one or more of the first and second medical images.

As indicated in FIG. 2, blocks 202 to 206 may be performed prior to, after, and/or in parallel with blocks 208 to 212. For example, although raw data may be captured at two different times, the processing of blocks 202 to 216 may be performed subsequently on this raw data.

In some embodiments, block 202 to 206 (or blocks 208 to 212) may be performed for a plurality of medical images each generated at a respective time. The plurality of medical images may each relate to different aspects of a scan. For example, the different aspects may be different phases of a CT scan (i.e. venous, arterial, etc.). In another example, the different aspects may be different spectral or energy bands of detected radiation. A combined texture metric may then be computed for each of the plurality of medical images for the respective time and texture metrics for different times may be compared for each of the aspects.

FIG. 3 shows a system 300 arranged to perform the method 200 described above with reference to FIG. 2.

In particular, the system 300 comprises one or more scanning devices 310 arranged to provide image data, ID, to an imaging database 320, which is stored as image data 330. The scanning devices 310 may be located in different geographical locations. The imaging database 320 may be remotely coupled to the scanning devices 310, e.g. through a communication network.

The image data, ID, may be in a raw form (e.g. based on scan data or in the form of a sinogram) or reconstructed form (e.g. following tomographic reconstruction). The image data, ID, may comprise a series of two-dimensional cross-sectional images, and/or a three-dimensional model reconstructed from the scan data or from the cross-sectional images. The image data, ID, may further comprise metadata indicating a scanning device 310 that performed the scan, parameters indicating properties of the scan and/or parameters indicating how the image data was generated (e.g. a kernel used in tomographic reconstruction). Pixel or voxel intensity values in the image data ID may represent the relative radio density of an object being scanned along a line from a radiation source to the corresponding detection location.

The system 300 also comprises a pre-processing unit 340, a texture analysis unit 350 and a change analysis unit 360.

The pre-processing unit 340 receives image data 330 from the database 320 and performs a pre-processing operation, PP, on the image data ID to generate pre-processed data (PPD). As described herein, the pre-processing operation may comprise applying a correction based on image metadata. For example, the metadata may indicate scanning characteristics such as one or more of: X-ray tube characteristics for a CT scanning device (e.g. tube type and/or age) and detector characteristics (e.g. scintillation crystal type and/or age, and/or a photodetector type). Each of these scanning device characteristics may be correlated with particular image properties, such as noise distributions. These correlations may be determined experimentally and/or by applying physical models. Hence, the pre-processing operation may perform noise filtering where the parameters of the noise filter are configured based on the scanning characteristics. The pre-processing operation may also comprise image normalization dependent on the scanning characteristics.

The texture analysis unit 350, performs texture analysis, TA, on the pre-processed (PP) data to generate one or more texture metrics, TM.

The change analyzer 360 receives texture metrics (TM1, TM2) based on a respective plurality of medical images, i.e. wherein one or more texture metrics are associated with a scan at a given time by one or more of the scanning devices 310. The change analyzer 360 analyzes the texture metrics (TM1, TM2) to output a change metric (CM).

The texture metrics may include one or more of: a pixel intensity metric; a pixel variation metric; a pixel correlation metric; an edge metric; and a spatial change metric. These metrics may be defined for particular regions of image data, e.g. k1 by k2 sub-areas of the area of interest. In this case, a texture metric feature vector may comprise a sequence of texture metrics for a sequence of spatial areas.

As examples, the texture metrics may include one or more of: mean pixel intensity, maximum pixel intensity, minimum pixel intensity, uniformity, entropy (e.g. an irregularity of a gray-level histogram distribution), standard deviation of the gray level histogram distribution, skewness (e.g. asymmetry of the gray level histogram), kurtosis (e.g. flatness of the gray level histogram histogram), energy or an angular second moment (e.g. pixel repetition and/or orderliness and measures of a co-occurrence matrix), dissimilarity (e.g. measurement of how different each pixel is), correlation (e.g. a measurement of gray tone linear dependencies), a run-length matrix (e.g. pixel texture in a specific direction), neighborhood gray-tone difference matrices (e.g. indicating spatial relationship among three or more pixels), contrast (e.g. a number of local variations within the image), coarseness (measurement of an edge density), busyness (e.g. measurement of spatial rate of gray-level change), heterogeneity (e.g. measurement of the presence of edges), and measures of non-uniformity (e.g. a neighboring gray level dependence matrix). These metrics may also be defined on a voxel basis for three-dimensional images.

In certain cases, a plurality of texture metrics may be computed and combined to generate a change metric. In one case, sets of texture metrics for the respective medical images may be compared and a weighted combination of this comparison may be used to calculate the change metric. In another case, sets of texture metrics may be combined in a weighted sum before being compared to compute the change metric. Weights may be based on learnt significance of change factors or may be predefined.

As described in more detail below, one or more texture metrics for each medical image may be supplied as a feature vector (e.g. TM1=[TMa, TMb, TMc, . . . TMn]). If texture analysis is performed on regions of area of interest of the medical images, e.g. using a sliding window function or kernel of size k1 by k2, with a given stride length (s1, s2) and a given level of padding in each dimension, then the feature vector may comprise a set of concatenated sub-vectors, wherein each sub-vector comprises a set of texture metrics for a given region of the area of interest. A feature vector may additionally comprise texture metrics for both the whole area of interest and regions of the area of interest.

In some examples, data indicating the at least one scanning device characteristic may be retrieved, or obtained, by parsing a Digital Imaging and Communications in Medicine, DICOM, data object associated with the respective image.

FIG. 4A is an image 410 depicting one example of a medical image. In the particular example shown in FIG. 4A the image 410 is a two dimensional medical image. The object, in this example, comprises a tumor 412 and other tissue 414, not part of the tumor. The tumor 412 may, for example, be a hepatocellular carcinoma and the other tissue 414 may, in such an example, be healthy liver tissue.

Also shown in FIG. 4A is example data 420-A representing scanning characteristics associated with the image 410. In the particular example shown, the data comprises a machine identifier, MID, which may be used to identify the type of scanning device used to generate image data, a scanning technique identifier, ST, which may be used to identify the scanning technique used using to generate image data, and a reconstruction kernel identifier, RK, which may be used to identify the reconstruction kernel used to reconstruct an image from the image data. In particular, in the example shown in FIG. 4A, "MID: 123XF34" may indicate a type of scanning device or a serial number of a particular scanning device, "ST: V-P1" may indicate that the scan was performed during a venous phase of a perfusion CT scan, and RK: 111 may indicate that a reconstruction kernel designated "111" was used to reconstruct image data. In certain cases, the scanning characteristics may comprise identifiers than enable a look-up operation to obtain metadata associated with a scan, e.g. a serial number of a particular scanning device may be used to retrieve configuration parameters for that device from a remote data source.

FIG. 4B is an image 430 depicting another example of the object 432 to be imaged using an imaging device 100. In the particular example shown in FIG. 4B, the image 430 is a three dimensional image.

Also shown in FIG. 4B is example data representing scanning characteristics associated with the image 430. In the particular example shown, the tag identifies a machine identifier, MID, which may be used to identify the type of scanning device used to generate image data, a scanning technique identifier, ST, which may be used to identify the scanning technique used using to generate image data, and a reconstruction kernel identifier, RK, which may be used to identify the reconstruction kernel used to reconstruct an image from the image data. In particular, in the example shown in FIG. 4B, "MID: 44SE11" may indicate a type of scanning device or a serial number of a particular scanning device, "ST: A-P2" may indicate that the scan was performed during an arterial phase of a perfusion CT scan, and RK:222 may indicate that a reconstruction kernel designated "222" was used to reconstruct image data.

FIG. 4C is an example of an area of interest identified in an image, such as the image 410 depicted in FIG. 4A. The area of interest may be defined by one of more characteristics of the area of interest. For example, in the example shown In FIG. 4C, the area of interest of the image 410 is characterized by a radius 442 of a circular area of interest and a center coordinate 444 of the circular area of interest. In certain examples, the control device 30 may indicate preliminary values for these characteristics on input unit 38, e.g. based on an image segmentation function. These characteristics may then be confirmed and/or modified by a human operator. Image segmentation may be performed in two and/or three dimensions.

In other examples, other characteristics may be used to identify or define the area of interest. For example, the area of interest may be identified or defined based on contrast, connected components, clustering, graph partitioning and/or thresholding.

Examples described herein improve upon manual comparison of medical images. For example, in order to compare one image with another image, taken at a different time, the input of a highly skilled person is typically required, e.g. a radiologist trained to recognize features in the image and make a judgment on differences between the images. This task is difficult and prone to error as different scanning devices have different image properties, e.g. different baseline intensities and/or noise profiles. Indeed, even if the same scanning device is used, environmental variables and/or factors such as component aging may result in different image properties for scans performed at different times.

In particular, images produced by two different machines (even of the same model) may have different radiation emission characteristics (i.e. the radiation sources may be subtly different) and/or different detection characteristics. That is, the spectrum of emission of one radiation source may be different to the spectrum of emission from another radiation source, and/or the spectral response of one detector may be different to the spectral response of another detector. Indeed the characteristics of radiation sources and detectors can change over time (for example, due to ageing).

Furthermore, the radiation source and detector of a scanning devices are typically controlled by an operator by setting scanning parameters of the scanning device. Such parameters may control, for example, a tube current and a field of emission of the radiation source and/or the gain of the detector. Such differences in scanning parameters between one image and another (even from the same scanning device) can give rise to differences in image data and can therefore affect the result of any processing and/or image analysis performed on such image data.

Finally, reconstruction parameters used to reconstruct images from image data produced in a scanning operation may differ between images, also affecting any processing and/or image analysis performed on such image data. In particular, different reconstruction kernels, specifying different reconstruction parameters, may be used in different machines.

In order to automate a comparison between image data resulting from different scans these differences must be compensated for. In some examples, this compensation may be done by ensuring that the various parameters are the same, though in practice this is not practical (particularly where different scanning devices are used). In examples where it is not possible to control the parameters to be the same, another method of compensation is needed.

In certain examples described herein, image processing may be selectively applied based on characteristics of a scan. For example, a correction factor may be determined to correct one image to correspond with another image, or to correct both images to correspond with a standard format. In certain cases, texture metrics may be selected based on the characteristics on a scan. For example, for a given scanning device or scan configuration, certain measures of pixel or voxel variation may generate a more accurate and/or robust change metric. As such, a subset of texture metrics M from a larger set of possible texture metric N may be selected based on the characteristics of a scan. In addition, based on a set of training images, variation based on a given scanning device or scan configuration may be taken into account within models used to compute the change metric. Each of these approaches may be used separately or in combination.

FIG. 5 is a schematic diagram of a system 500 that may be used to configure components of the system 300. The system 500 comprises a configuration engine 505 that is arranged to receive image data 530. Image data 530 may comprise a corpus of training data in the form of medical images. The image data 530 may contain, as metadata, data representing scanning characteristics associated with each image. For example, the image data 530 may comprise data indicative of the scanning device on which the image data was taken, scanning parameters of the scanning device on which the image data was taken, data indicating a particular scanning method or phase, and/or reconstruction parameters applied to the image data.

The configuration engine 505 comprises an image correction engine 512, a feature extractor 514, and a model builder 516.

The image correction engine 522 generates, on the basis of the image data 530, correction parameters 522 that are used by a pre-processing unit 540 to process image data. The pre-processing unit 540 may comprise an implementation of the pre-processing unit 340 of FIG. 3.

In one implementation, the image correction engine 512 is configured to receive pairs of images representing unprocessed and pre-processed versions of a medical image. The pre-processed version of the medical image may comprise a result of manual processing or normalization of the unprocessed version of the medical image. In this case, image metadata and unprocessed images may be provided as input to a machine learning function that is trained by the image correction engine 512, and the output may be compared to the pre-processed versions of the images. Configuration parameters 522 representing parameters of the machine learning function may then be optimized, e.g. based on a loss function indicating a difference between a predicted output and the pre-processed image versions. The pre-processing units 540 may then apply the machine learning function, as parameterized by the configuration parameters 522, to new image metadata and an unprocessed image to output a pre-processed or normalized version of the unprocessed image.

In another implementation, the image correction engine 512 may receive a reference or baseline image of a known object. The image correction engine 512 may then receive calibration images of the same object from different scanning devices with different configurations, wherein the scanning device and the configuration are parameterized within metadata accompanying the calibration images. The image correction engine 512 may then compute the configuration parameters 522 by determining a transformation from the calibration images and the metadata to the reference or baseline image. Again the transformation embodied in the configuration parameters 522 may be applied by the pre-processing unit 540 to received images and metadata.

In another case, the image correction engine 512 may be configured to determine configuration parameters 522 for a defined image processing filter. For example, the image processing filter may apply linear and/or non-linear smoothing to an input image. In this case, the image correction engine 512 may receive pairs of unprocessed and processed images (wherein the processed images may be a baseline image) and metadata indicating characteristics of a scan and compute a mapping between the metadata and the parameters for the image processing filter, e.g. using a machine learning function.

The feature extractor 514 generates, on the basis of the image data 530, feature parameters 526 that are used by a texture analysis unit 550 to configure texture analysis, e.g. as performed by texture analysis unit 350 in FIG. 3. For example, the feature parameters 526 may indicate a set of texture analysis functions to apply to image data to generate a texture analysis feature vector based on metadata associated with a medical image.

For example, image data 530 may comprise a pair of medical images generated by two consecutive scans of an object. The image data 530 may also comprise metadata associated with the scan, e.g. an indication of the object and any actions applied to the object between the scans, and a ground truth indication of whether a change is present between the images. The image data 530 may comprise processed or normalized image data, e.g. as applied by pre-processing unit 540 (e.g. after the training above) or externally. This ground truth indication may be based on manually applied labels. The feature extractor 514 may be configured to compute ranks and/or weights for a set of N texture metrics (e.g. based on those listed above) based on their influence in predicting the supplied change classification. Based on these ranks and/or weights, a subset of M texture metrics may be selected for input to the change analyzer 560. This selection may also be performed using ranking algorithms, thresholding or dimensionality reduction techniques such as principal component analysis or linear discriminant analysis. This selection may help to exclude texture metrics that propagate noise and increase the risk of error in the change metric.

In one case, a list of texture metric values may be computed for each image. The texture metric values for each image may then be concatenated, together with metadata values. The resultant feature vectors may then be input to a machine learning function. Parameters for the machine learning function, such as weights and biases, may then be optimized based on a difference between a predicted output and the ground truth indication. These parameters may then be used to select a subset of texture metrics for particular configurations, e.g. based on the optimized weight values.

The model builder 516 computes, on the basis of the image data 530, model parameters 528 that are used by a change analyzer 560, e.g. change analyzer 360 in FIG. 3, to output a change metric. The model builder 516 may use the output of texture analysis unit 550 (e.g. after the training above), such as a feature vector of M texture metrics per image or image region, to generate model parameters 528, or may use texture metrics supplied as part of image data 530 (e.g. previously processed training data). The model builder 516 also receives a ground truth indication of whether a change is present between the images. This may comprise a label and/or change level, e.g. a particular category of change or percentage difference. An indication of change may be supplied with a spatial resolution, e.g. for one or more sets of pixels in an area of interest. Based on the training data the model builder 516 may compute a set of model parameters 528 that map the texture metric feature vectors to the indication of change.

It should be noted that in certain implementations, the configuration engine 505 may combine the functions of the image correction engine 512, the feature extractor 514 and the model builder 516 as part of a common machine learning function. For example, the configuration engine 505 may receive image data 530 comprising pairs of medical images generated at different times, metadata and labelled values of at least one change metric and be trained to determine parameters for one or more transformations (whether linear or non-linear) that are applied to generate one or more change metric values.

The machine learning functions or algorithms described herein may be implemented based on one or more of: support vector machines, Bayesian classifiers, k-means clustering, decision trees, convolutional neural networks, deep belief networks, deep residual learning, reinforcement learning, recurrent neural networks, inductive programming, genetic algorithms and evolutionary algorithms.

FIG. 6A is a schematic diagram illustrating a scanning device 600 according to an embodiment of the invention.

The scanning device 600 comprise a scanning unit 620, an imaging unit 630, a texture analysis unit 640, and an image comparison unit 650.

The scanning unit 620 is arranged to detect radiation received during a scanning operation to scan an object, such as a scanning operation performed using the scanning device 1 depicted in FIG. 1.

The imaging unit 630 is arranged to reconstruct an image for a location on the object based on the detected radiation. For example, the imaging unit may be a processor configured with a reconstruction kernel for reconstructing an image based on the detected radiation.

The texture analysis unit 640 is to receive an indicated area of interest of a medical image and compute at least one texture metric for the area of interest. In particular, the texture analysis unit 640 performs texture analysis, TA, on the pre-processed (PP) data to generate texture metrics, TM, as indicated in FIG. 3 above. The texture analysis unit 640 may have access to configuration parameters for a scan as stored in a memory of the scanning device. These configuration parameters may comprise details of installed components and/or operating parameters. These configuration parameters may be used to process the image data ID and configure a set of texture analysis functions.

The texture analysis may comprise determining a feature vector (i.e. an N-dimensional vector of numerical features that represent the object being imaged) based on, for example, pixel values of a respective medical image, applying a machine learning function to the feature vector, and generating a texture metric associated with a respective time based on an output of the machine learning function.

The texture metrics may include one or more of: a pixel intensity metric; a pixel variation metric; a pixel correlation metric; an edge metric; and a spatial change metric.

The image comparison unit 650 is arranged to receive the texture metrics from the texture analysis unit 640 for a common area of interest within respective medical images and to output a change metric indicating a measure of variation over time for the area of interest based on a comparison of the plurality of texture metrics.

FIG. 6B is a schematic diagram showing another scanning 615 according to an embodiment of the invention. The scanning device 615 comprises a radiation source 625. In common with the scanning device 600 depicted in FIG. 6A, the scanning device shown in FIG. 6B comprises a scanning unit 620, an imaging unit 630, a texture analysis unit 640, and an image comparison unit 650.

The scanning device 615 also includes a display unit 660 such as the output unit 39 described above with reference to FIG. 1. In such embodiments, the image comparison unit 650 may be configured to output the change metric, CM, as a color overlay upon a medical image for display on the display unit 660.

The scanning device 615 also includes a graphical user interface 665 arranged to indicate an area of interest, AoI, within a medical image. The identified area of interest may be supplied to the texture analysis unit 640, to enable the texture analysis unit 640 to perform texture analysis on the area of interest.

FIG. 7 is a schematic diagram of a processor 710 and a non-transitory machine-readable storage medium 720 such as a memory. The non-transitory machine-readable storage medium 720 stores instructions 730 that, when executed by the processor 710, cause the processor to perform a number of operations. The non-transitory machine-readable storage medium 720 also stores data 740 for, and resulting from, the operations. Although shown stored within a single unit in FIG. 7, the instructions 730 and data 740 may be stored in separate memories in certain implementations.

In a first obtaining operation 732, data indicating a first set of texture measures computed for a first medical image 742 of an object is obtained. In a second obtaining operation 734, a second set of texture measures computed for a second medical image 744 of the object is obtained. The first and second obtaining operations 732, 734 may obtain the respective sets of texture measures from memory 720 communicatively coupled to the processor 710. The first and second medical images may be generated from different scans of the object with a scanning device or with multiple scanning devices. The instructions cause the processor 710 to compare the second set of texture measures with the first set of texture measures to generate an indication of variation 746 of the object between the different scans. This indication of variation 746 may, for example, indicate a change in a tumor between the two scans. The indication of variation 746 may be output as a visual overlay over one or more of the medical images. Colors within the visual overlay may represent an amount of change in the object, e.g. quantized bands of percentage change in regions of the first medical image as compared to the second medical image.

While the invention has been illustrated and described in detail with the help of a preferred embodiment, the invention is not limited to the disclosed examples. Other variations can be deducted by those skilled in the art without leaving the scope of protection of the claimed invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method of comparing medical images generated by scanning devices, the method comprising:
   retrieving a first medical image generated at a first time;
   identifying an area of interest within the first medical image;
   retrieving a second medical image generated at a second time, the second time different from the first time;
   identifying the area of interest within the second medical image;
   performing texture analysis on the area of interest within the first medical image and the second medical image to determine at least one texture metric associated with the first medical image and at least one texture metric associated with the second medical image, wherein the performing texture analysis includes,
      applying at least one correction factor to at least one of the first medical image or the second medical image;
   comparing the at least one texture metric associated with the second medical image with the at least one texture metric associated with the first medical image; and
   outputting a change metric based on the comparison, the change metric indicating a measure of variation over time for the area of interest,
   wherein the at least one correction factor is based on at least one scanning characteristic, the at least one scanning characteristic including data associated with one or more of,
      a configuration of a scanning device used to obtain the at least one of the first medical image or the second medical image,
      a method of scanning applied by the scanning device to obtain the at least one of the first medical image or the second medical image, or
      a reconstruction method used to generate the at least one of the first medical image or the second medical image based on radiation detected by the scanning device.

2. The method of claim 1, wherein the performing texture analysis comprises:
   retrieving data indicating the at least one scanning characteristic; and calculating the at least one correction factor based upon the at least one scanning characteristic.

3. The method of claim 2, wherein the retrieving data indicating at least one scanning characteristic comprises:
   parsing a Digital Imaging and Communications in Medicine (DICOM) data object associated with the at least one of the first medical image or the second medical image.

4. The method of claim 2, wherein each of the first medical image and the second medical image is at least one of:
   a two-dimensional tomographic image;
   a three-dimensional image;
   a four-dimensional image; or
   a multi-spectral image.

5. The method of claim 1, wherein the applying at least one correction factor comprises at least one of:
- using the at least one correction factor to configure a pre-processing operation and applying the pre-processing operation to the at least one of the first medical image or the second medical image; or
- using the at least one correction factor to configure a texture analysis function and applying the texture analysis function to the at least one of the first medical image or the second medical image.

6. The method of claim 1,
wherein the performing texture analysis includes,
- performing texture analysis on the area of interest within a third medical image, the third medical image generated at the first time, and the first medical image and the third medical image related to different aspects of a scan by a scanning device,
- performing texture analysis on the area of interest within a fourth medical image, the fourth medical image generated at the second time, and the second medical image and the fourth medical image related to the different aspects of a scan by a scanning device, and
- computing a first combined texture metric for the first medical image and the third medical image, and computing a second combined texture metric for the second medical image and the fourth medical image; and
wherein the comparing the at least one texture metric includes,
- comparing the first combined texture metric with the second combined texture metric.

7. The method of claim 1, wherein the at least one texture metric comprises one or more of:
- a pixel intensity metric;
- a pixel variation metric;
- a pixel correlation metric;
- an edge metric;
- a spatial change metric; or
- a frequency change metric.

8. The method of claim 1, wherein the performing texture analysis comprises:
- determining a feature vector for each of the first medical image and the second medical image based on pixel values of the respective medical image;
- applying a machine learning function to each feature vector; and
- generating the at least one texture metric associated with each of the first medical image and the second medical image based on a respective output of the machine learning function.

9. The method of claim 1, wherein the comparing the at least one texture metric associated with the second medical image with the at least one texture metric associated with the first medical image comprises:
- generating a feature vector based on the respective texture metrics;
- applying a machine learning function to the feature vector; and
- determining the change metric based on an output of the machine learning function.

10. The method of claim 1, wherein the change metric comprises at least one of:
- a distance metric as a measure of change between the first medical image and the second medical image; or
- a feature vector indicating a state change between the first medical image and the second medical image.

11. The method of claim 1, wherein the second time is subsequent to the first time.

12. A scanning device comprising:
- a scanning unit configured to detect radiation during a scanning operation on an object; and
- processing circuitry configured to cause the scanning device to,
  - reconstruct an image for a location on the object based on the detected radiation,
  - compute at least one texture metric for an indicated area of interest of a medical image by applying at least one correction factor to the medical images,
  - receive a plurality of texture metrics for a common area of interest within respective other medical images, and
  - output a change metric indicating a measure of variation over time for the indicated area of interest based on a comparison of the plurality of texture metrics,
  - wherein the at least one correction factor is based on at least one scanning characteristic including data associated with one or more of,
    - a configuration of the scanning device used to obtain the medical image,
    - a method of scanning applied by the scanning device to obtain the medical image, or
    - a reconstruction method used to generate the medical image based on radiation detected by the scanning device.

13. The scanning device of claim 12, wherein the scanning unit comprises one of:
- an X-ray computed tomography scanning device;
- a positron emission tomography scanning device; or
- a magnetic resonance image scanning device.

14. The scanning device of claim 12, further comprising:
- a display unit,
- wherein the processing circuitry is further configured to cause the scanning device to output the change metric as a color overlay on a medical image for display on the display unit.

15. The scanning device of claim 12, further comprising:
- a graphical user interface configured to indicate the indicated area of interest of the medical image.

16. The scanning device of claim 12, wherein the medical image is at least one of:
- a two-dimensional tomographic image;
- a three-dimensional image;
- a four-dimensional image; or
- a multi-spectral image.

17. A non-transitory machine-readable storage medium storing instructions that, when executed by a processor, cause the processor to:
- obtain data indicating a first set of texture measures computed for a first medical image of an object;
- obtain data indicating a second set of texture measures computed for a second medical image of the object, the first medical image and the second medical image being respectively generated from different respective scans of the object within a scanning device,
  - wherein the first set of texture measures and the second set of texture measures are calculated by applying at least one correction factor to at least one of the first medical image or the seconf medical image; and
- compare the second set of texture measures with the first set of texture measures to generate an indication of variation of the object between the different scans, wherein the at least one correction factor is based on at least one scanning characteristic including data associated with one or more of,
- a configuration of a scanning device used to obtain the at least one of the first medical image or the second medical image,
- a method of scanning applied by the scanning device to obtain the at least one of the first medical or the second medical image, or
- a reconstruction method used to generate the at least one of the first medical image or the second medical image based on radiation detected by the scanning device.

18. The non-transitory machine-readable storage medium of claim 17, wherein at least one of the first medical image and the second medical image is at least one of:
- a two-dimensional tomographic image;
- a three-dimensional image;
- a four-dimensional image; or
- a multi-spectral image.

* * * * *